Sept. 21, 1943.   R. H. WHISLER, JR   2,329,803
INERTIA CONTROLLED SHOCK ABSORBER
Filed Oct. 6, 1941   4 Sheets-Sheet 1

INVENTOR.
RALPH H. WHISLER JR.
BY Whittemore Hulbert & Belknap
ATTORNEYS

Sept. 21, 1943.   R. H. WHISLER, JR   2,329,803
INERTIA CONTROLLED SHOCK ABSORBER
Filed Oct. 6, 1941   4 Sheets-Sheet 2

INVENTOR.
RALPH H. WHISLER JR.
BY Whittemore Hulbert Belknap
ATTORNEYS

Sept. 21, 1943.   R. H. WHISLER, JR   2,329,803
INERTIA CONTROLLED SHOCK ABSORBER
Filed Oct. 6, 1941   4 Sheets-Sheet 3

INVENTOR.
RALPH H. WHISLER JR.
BY
ATTORNEYS

Sept. 21, 1943.  R. H. WHISLER, JR  2,329,803
INERTIA CONTROLLED SHOCK ABSORBER
Filed Oct. 6, 1941  4 Sheets-Sheet 4

INVENTOR.
RALPH H. WHISLER JR.
BY Whittemore Hulbert & Belknap
ATTORNEYS

Patented Sept. 21, 1943

2,329,803

UNITED STATES PATENT OFFICE 2,329,803

INERTIA CONTROLLED SHOCK ABSORBER

Ralph H. Whisler, Jr., Monroe, Mich., assignor to Monroe Auto Equipment Company, Monroe, Mich., a corporation of Michigan Application October 6, 1941, Serial No. 413,862

25 Claims. (Cl. 188—88)

This invention relates generally to shock absorbers and refers more particularly to improvements in hydraulic shock absorbers of the direct-acting type adapted to be installed on a motor vehicle and having a ported piston working in a pressure cylinder in dependence upon relative movement of the parts of the vehicle with which the shock absorber is connected, and in addition having valve means in association with the piston for regulating the passage of the hydraulic fluid medium through the piston in both directions of movement of the latter in the fluid pressure chamber.

It is desirable that the up and down movement of a vehicle body relative to its supporting wheels be restricted to a minimum so that the occupant of said vehicle body will have a smooth ride. Therefore, it is an important object of the present invention to provide a shock absorber that is operable when the body of a vehicle attempts to move up or down to highly resist or prevent such movement.

It is also desirable that the reaction to the vehicle body be reduced to a minimum when the ground wheels move up or down; therefore, it is another object of the invention to provide a shock absorber that will permit the ground wheels to move up and down relative to the vehicle body without moving the latter any objectionable amount. In other words, my improved shock absorber is constructed so that it will allow the ground wheels to move freely without materially affecting the body and will restrict the movement of the body while allowing the wheels free movement.

Another object is to provide a shock absorber that not only is capable of effectively controlling in both directions the vertical movement of the body and wheels of a vehicle, but is durable in construction and will afford highly satisfactory operation over a long period of use.

Other objects, advantages and novel details of construction of this invention will be made more apparent as this description proceeds, especially when considered in connection with the accompanying drawings, wherein:

Ordinarily, shock absorber movements can be divided into four classifications:

A—Movements of the ground wheels upward resulting in compression of the shock absorber;

B—Movement of the vehicle body downward resulting in compression of the shock absorber;

C—Movement of the ground wheels downward resulting in extension or rebound of the shock absorber;

D—Movement of the vehicle body upward resulting in extension or rebound of the shock absorber.

When movements A and C occur, little resistance in the shock absorber is desired because resistance here would tend to make the vehicle body move with the ground wheels. By the same token, when movements B and D are encountered, much resistance is desirable to prevent the vehicle body from moving.

With present day spring suspensions, the movements listed above continually follow one upon the other; therefore, it is the job of the inertia shock absorber described herein to separate them and act correctly on each attempt of the ground wheels or vehicle body to move relative to each other.

Referring now to the drawings, A is a shock absorber of the direct-acting type embodying my invention and having a tubular pressure chamber 10, a tubular reserve chamber 11 enclosing and substantially concentric with the pressure chamber, a dust shield 12 including a tube 13 substantially concentric with the reserve chamber 11 and an end plate 14 rigid with said tube, a piston 15 within and movable lengthwise of the pressure chamber, a rod 16 connected to the end plate 14 and adapted to actuate the piston 15, a guide 17 for the piston rod 16 forming a common closure for the adjacent ends of the pressure chamber 10 and reserve chamber 11, a seal 18 within the outer portion of the guide 17 and frictionally engaging the piston rod 16, and a packing unit 19 encircling the piston rod at the top of the seal 18. Preferably the guide 17 has an annular recess or pocket 20 encircling the piston rod 16 and adapted to receive any hydraulic medium wiped off the rod 16 by the seal 18 and has an inclined passage 21 for conducting such medium from the recess 20 to the reserve chamber 11. Any suitable means such as the heads 22 and 23, respectively, rigid with the end plate 14 and closed lower end 24 of the reserve chamber 11 may be used when connecting the shock absorber to the sprung and unsprung weight such as the body and axle (not shown) of a vehicle.

In the present instance, the piston rod 16 is quite short and has a hollow substantially tubular inner end portion 25. Threadedly engaging the inside and forming an endwise extension of this tubular end portion 25 is a tubular member 26 provided at its lower end beneath the piston 15 with an enlargement 27. Located on the tubular member 26 at points between the piston 15 and inner end portion 25 of the piston rod and between the piston 15 and the enlargement 27 are relatively thick guides 28 and 29 respectively, for annular slides 30 and 31, respectively. Between inwardly extending lateral flanges 32 and 33, respectively, of these slides and the top and bottom of the piston 15 are laminated leaf or disk spring valves 34 and 35, respectively, for controlling two sets of crossed passages 36 and 37 in the piston 15. Washers 38 and 39, respectively, clamp the valves 34 and 35 against the top and bottom of the piston and also clamp against the guides 28 and 29, respectively, single star-shaped leaf springs 40 and 41, respectively, that overlap the flanges 32 and 33, respectively, of and normally retain the flanges 32 and 33 of the slides 30 and 31 in engagement with the laminated valves 34 and 35.

Preferably the flanges 32 and 33, respectively, of the slides are recessed to provide spaces 42 and 43, respectively, for the reception of the hydraulic medium. It will also be noted that the guides 28 and 29, respectively, and slides 30 and 31 are cooperatively recessed to provide high pressure annular chambers 44 and 45, respectively, for the hydraulic medium. Between the bases 32 and 33 of the slides and the spacers 38 and 39 are passages 46 and 47, respectively, that are in open communication with the high pressure chambers 44 and 45 and that are preferably in alignment with the adjacent ends of but always prevented by the valves 34 and 35 from being in communication with the crossed passages 36 and 37 in the piston. Located in the tubular member 26 at spaced points vertically thereof, preferably in horizontal alignment with the guides 28 and 29, are two sets of transversely extending passages 48 and 49, respectively. Recesses 50 and 51, respectively, are provided in the outer sides of the tubular member 26 at the outer ends of the transverse passages 48, while passages 52 and 53, respectively, extend diagonally in the guides 28 and 29 between said recesses and the pressure chambers 44 and 45. Other recesses 54 and 55, respectively, are provided between portions of the tubular member 26, guides 28, 29, spacers 38, 39 and piston 15, while passages 56 and 57, respectively, extend diagonally in the piston 15 from the last mentioned recesses 54 and 55 to the two sets of crossed passages 36 and 37, respectively, in said piston.

Located within the pressure chamber 10 at the lower end thereof beneath the lowermost guide 29 is an inertia weight 60 having at its upper end an upstanding tubular stem 61 functioning as a valve that slidably engages the inner wall of the tubular member 26 and has suitable recesses 62 and 63, respectively, for establishing communication between the passages 48 and 49 in said tubular member. Extending axially of and free from the weight 60 is a center rod 64 having an enlarged upper end 65 pressed within the tubular member 26 at its upper end and having a horizontally threaded lower end portion 66. A nut 67 is mounted on the lower end portion 66 of the rod beneath the weight 60, a cup-shaped cap 68 is carried by the nut 67 and slidably engages the inside of a tubular shield 69 for the weight, and a coil spring 70 encircles the rod 64 between the cap 68 and the top wall 71 of a recess 72 in the weight 60. Preferably the tubular shield 69 has an inturned flange 73 at its upper end clamped between the lowermost guide 29 and the enlargement 27 of the tubular member 26, while the weight 60 has an upstanding projection 74 movable in the space 75 bounded by the shield 69, flange 73 and enlargement 27. A leaf spring 76 is clamped between the flange 73 of the shield and the enlargement 27 of the tubular member 26 and is adapted to be engaged by the upstanding projection 74 of the weight 60 to form a yieldable stop for said weight on its upward movement, while another leaf spring 77 is anchored in the cup 68 at the lower end of the coil spring 70 and is adapted to be engaged by the lower end of the weight 60 to form a yieldable stop for said weight on its downward movement.

At the lower end of the pressure chamber 10 beneath the center rod 64 is a compression valve assembly 80 which preferably comprises a body 81 secured to the lower end of the pressure chamber 10 and having a relatively large central opening 82 and a series of smaller openings 83, a disk flapper valve 84 controlling the central opening 82 and having peripheral openings 85 therein registering with the smaller openings 83, spring arms 86 normally holding the disk valve 84 in closed position, and a laminated leaf spring valve 87 carried by the body 81 on the underside thereof for controlling the smaller openings 83. Preferably the body 81 has a depending flange 88 engaging indentations 89 of the closed bottom 24 of the reserve chamber 11, and said indentations and flange 88 are constructed and arranged in such a way that passages for the hydraulic medium are provided between the indentations 89 beneath the flange 88 to allow said medium to flow freely past the flange from the reserve chamber 11 to the valve assembly 80 and vice versa.

In use, the laminated spring valves 34 and 35, respectively, cover the crossed passages 36 and 37, respectively, in the piston 15 and provide the shock absorber resistance both on compression and rebound. The number and thickness of the laminations of said valves determine the resistance. The slides 30 and 31 constitute pressure seals which allow pressure to be exerted against the laminated spring valves 34 and 35 when the stem 61 of the inertia weight 60 permits the high pressure chamber passages 48 and 49 to be opened. This provides the high resistance stage. The single leaf springs 40 and 41 assure constant contact between the slides 30 and 31 and the laminated spring valves 34 and 35, respectively. The slides 30 and 31 have a close fit on the guides 28 and 29, and the passages 52 and 53 in the latter allow the pressure to be built up in the high pressure chambers 44 and 45 when the passages 48 and 49 are opened by the stem 61 of the inertia weight 60. The piston rod 25 and tubular member 26 carry the inertia weight 60, piston 15, valves 34 and 35 and associated parts.

The tubular member 26 is precision finished on the inside thereof to allow the stem 61 of the inertia weight 60 to move freely relative thereto. Such tubular member 26 cooperates with the piston rod 25 to hold the piston 15, valves 34 and 35 and associated parts in proper relation to the piston rod 25. The inertia weight 60 acts to open and close the pressure passages 48 and 49. The recesses 62 and 63 in the outside of the stem 61 of the inertia weight serve to establish communication between the high pressure passages 48 and 49 when the inertia weight 60 is in a predetermined position. The spring 70 supports the inertia weight 60 and allows it to move at proper frequency and amplitude. The shield 69 and cap 68 prevent fluid turbulence from disturbing the action of the inertia weight 60. The cap 68 is capable of sliding relative to the shield 69 to allow adjustment of the nut 67 to vary the position of inertia weight 60 while still cooperating with the shield 69 to protect the inertia weight 60 from fluid turbulence. Adjustment of the nut 67 changes the position of the inertia weight stem 61 with respect to the high pressure passages 48 and 49. The leaf springs 76 and 77 stop the inertia weight 60 from bumping solidly against the flange 73 of the shield and cup 68 and consequently prevent noise from developing. Preferably the construction of the piston valve 34 is such relative to the compression valve 87 that the piston valve 34 will open before the compression valve. For example, when the piston rod 25 enters the pressure chamber 10, the rod fluid displacement flows out through the passages 83 past the laminated leaf spring valve 87. As the piston rod 25 is pulled out of the pressure chamber 10, the flapper disk valve 84 lifts against the tension of the spring arms 86 so that fluid from the reserve chamber 11 flows through the central passage 82 into the pressure chamber 10. The indentations 89 in the bottom 24 of the reserve chamber 11 allow the passage therebetween of the fluid under the compression valve assembly 80 from the reserve chamber 11 to said valve assembly and vice versa.

Figures 10, 11:
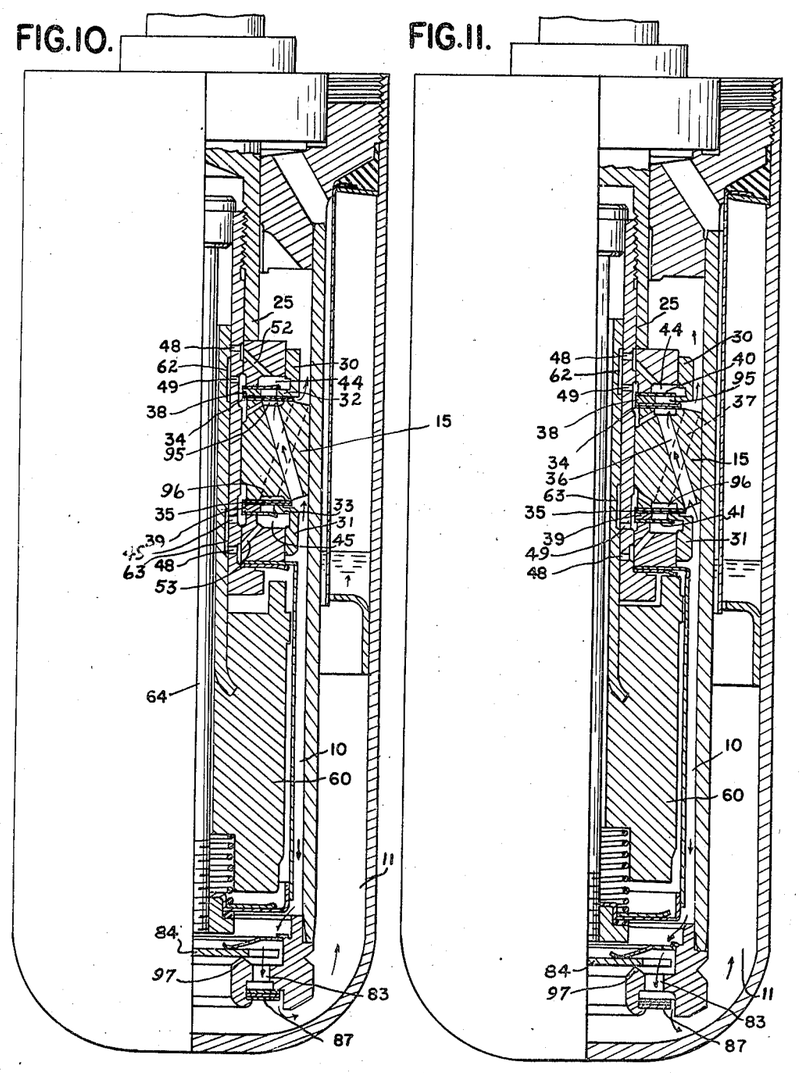
Figures 10, 11 and 12 are layouts showing the flow of the hydraulic medium during various stages of operation of my shock absorber.
Figure 12:
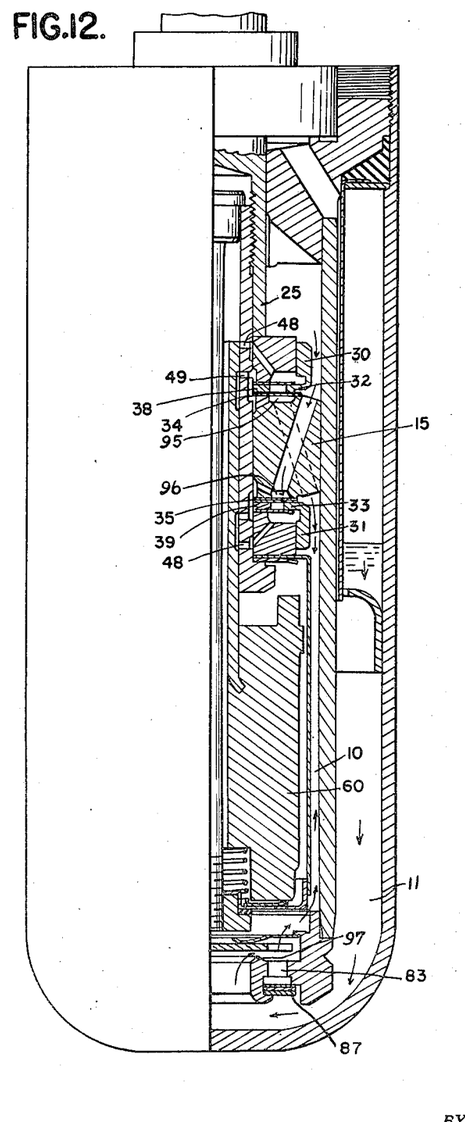

Figures 10, 11 and 12 illustrate various stages of the operation of my shock absorber. For example, Figure 10 shows the flow of the hydraulic medium on the compression stroke of the piston 15 when the ground wheels or unsprung weight of the vehicle move upwardly (movement A). At this stage, very little control is desired as the piston rod 25 enters the pressure chamber 10. As the inertia weight 60 is carried by the body or sprung weight of the vehicle, it will not move if the vehicle body does not move. The inertia weight 60 is set so that in the neutral position the high pressure passages 48 and 49 are closed. Considering the inertia weight 60 is fixed in neutral position, the fluid flow is noted by the arrows in Figure 10. As the piston 15 moves down on its compression stroke, the fluid under pressure causes the outer periphery of valve 34 to be flexed upwardly thereby lifting slide 30 and permitting fluid to flow through piston passages 36 and past the periphery of valve 34 with only slight resistance thereto. Inasmuch as the piston rod 25 is entering the pressure chamber 10, a like volume of fluid must pass out through the compression valve passages 83 past the valve 87. Thus, the tension of the valve 87 must be greater than that of the piston compression valve 34 in order that the pressure chamber 10 may be kept full of fluid at all times.

If the magnitude of movement considered is enough, the reactions of the vehicle springs plus slight shock absorber control will cause the vehicle body to move a small distance upward. Thus, the piston 15 of the shock absorber will also move upward while the inertia weight 60, due to its suspension, will lag behind. In spite of this movement of the inertia weight 60, it is still desirable to keep shock absorber resistance to a minimum.

When the vehicle body attempts to move suddenly and rapidly downward toward the ground wheels of the vehicle (movement B), it is desirable to dampen this accelerated movement immediately by employing high resistance to this compression stroke. As the piston 15 of the shock absorber moves downward, the inertia weight 60 will lag, opening the high pressure passages 48 and 49, as illustrated in Figure 11. When the pressure passages 48 and 49 are open, there is fluid pressure on both sides of the valve 34, thus increasing the effective clamping diameter. The washer 38 clamps the inner periphery of valve 34 against the piston 15, while the fluid admitted to the pressure chamber 44 forces the slide 30 against the valve 34 adjacent its outer periphery to oppose upward flexing movement of said outer periphery and thereby provide increased resistance to the flow of the fluid past said valve. Some of the fluid admitted to the pressure chamber 44 enters passage 46 to engage the back of valve 34 and thereby provide additional resistance to the opening movement of said valve. Consequently, the shock absorber resistance is increased as desired. Actually the flow of the hydraulic medium as illustrated in Figure 11 is the same as that illustrated in Figure 10, except for the flow of the medium through the high pressure passage 48 to the high pressure chamber 44.

Operation of the shock absorber for movements C and D is quite similar to that described above in connection with movements A and B, except that the rebound parts are in operation. For example, in Figure 12, the flapper disk valve 84 is open to allow the hydraulic medium to refill the pressure chamber 10 as the piston rod 25 is pulled out of the pressure chamber 10, and the arrows set forth in said figure indicate the flow of the hydraulic medium during these operations.

The controlling action of the inertia weight-operated element 61 with respect to the passages controlled thereby and the manner in which passages 52 and 53, recesses 54 and 55, and passages 56 and 57 function during the operation of the shock absorber may be described more in detail as follows.

Figure 1:
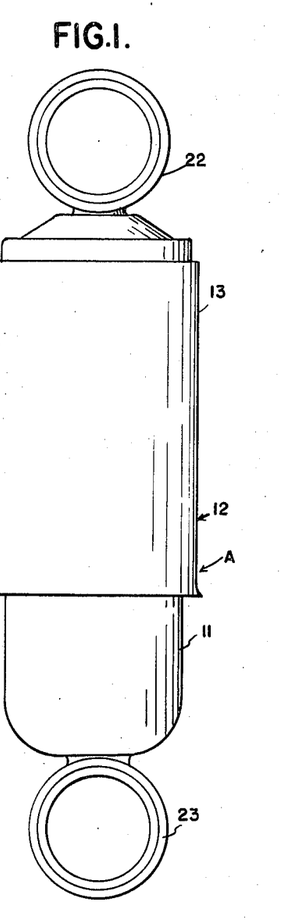
Figure 1 is an elevation of a shock absorber embodying my invention.
Figures 2, 4, 5, 6, 7, 9, 13:
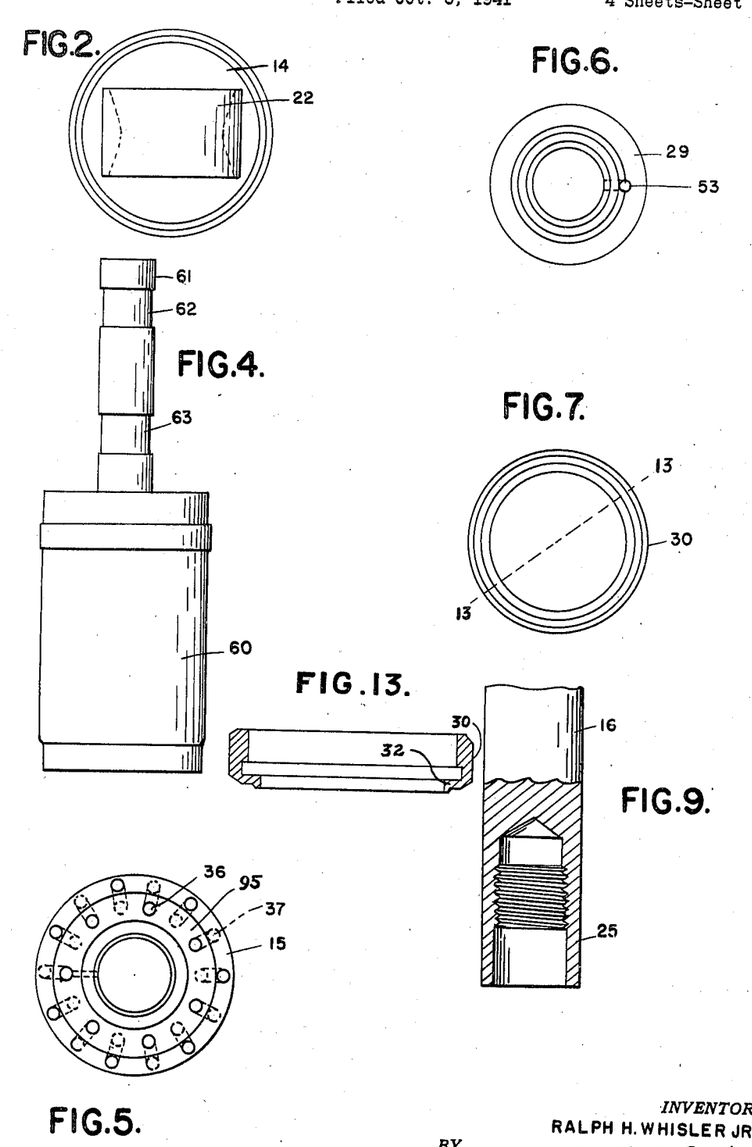
Figure 2 is a top plan view thereof.
Figure 4 is a detail view of the inertia weight.
Figure 5 is a detail view of the piston.
Figure 6 is a detail view of one of the guides.
Figure 7 is a detail view of one of the slides.
Figure 9 is a detail view of the piston rod.
Figure 13 is a sectional view taken on line 13—13 of Figure 7.
Figure 3:
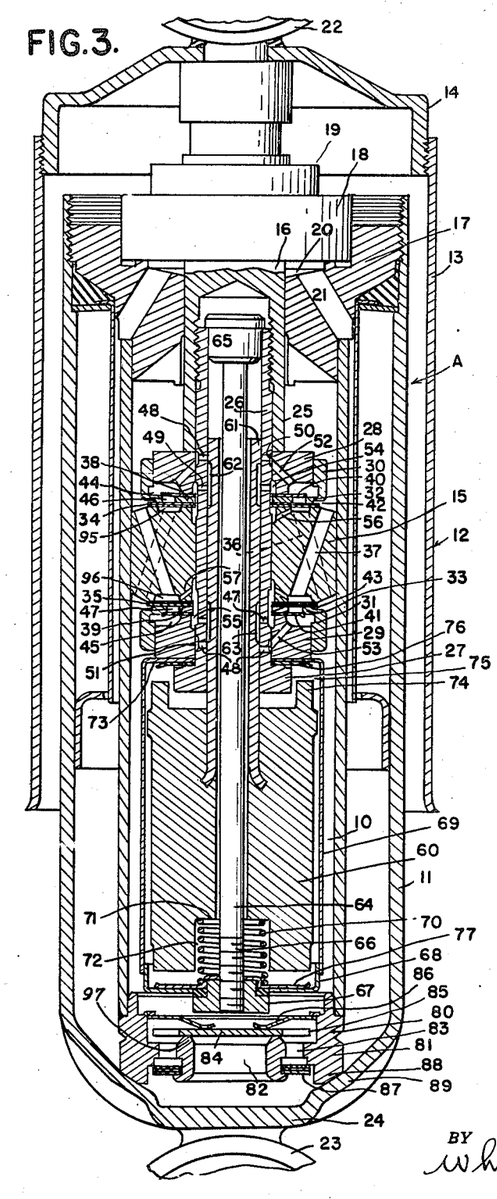
Figure 3 is a vertical sectional view through the shock absorber.
Figure 8:
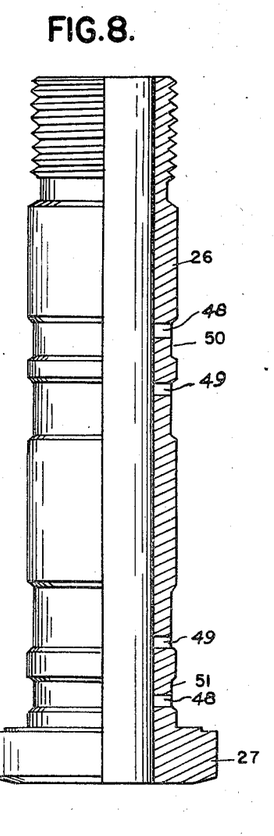
Figure 8 is a detail view of the valve holder.

Normally the recess 62 in the stem 61 of the weight 60 is below and out of communication with the uppermost passage 48 while the recess 63 in said stem is above and out of communication with the lowermost passage 48, as in Figure 3, hence no fluid in the pressure chamber 10 flows to either pressure chamber 44 or 45.

When the upward movement of the ground wheels or unsprung weight of the vehicle causes compression of the shock absorber (movement A), then the weight 60 assumes a slightly lowered position in the pressure chamber 10, as illustrated in Figure 10, and causes the stem 61 to slide downwardly a corresponding amount relative to the tubular member 26. Consequently, the recess 62 in the stem 61 remains out of communication with the uppermost passage 48 while the recess 63 establishes communication between the lowermost passages (rebound high pressure ports) 48 and 49. However, such communication between the lowermost passages 48 and 49 is ineffective at this time because the flow of fluid through the piston 15 is upwardly through passages 36 past valve 34 to the space in the pressure chamber 10 above the guide 28, instead of downward in passages 37 in said piston, through passage 57 and recess 55 to the lowermost passage 49. As a result, no fluid from the pressure chamber 10 is supplied to the pressure chamber 45. Likewise, no fluid from the pressure chamber 10 can reach pressure chamber 44 because communication between the uppermost passages (high pressure ports) 48 and 49 is cut off by resistance 62. Thus, in this instance, the resistance to the flow of fluid upward through the piston 15 is provided only by the valve 34 and the pressure exerted by the spring 40 upon the flange 32 of slide 30 against said valve. Resistance is also provided by the valve 87 as the fluid at the lower end of pressure chamber 10 flows downwardly through passage 83 past the outer periphery of said valve to the reserve chamber 11.

When the vehicle body or sprung weight of the vehicle attempts to move suddenly and rapidly downward toward the ground wheels of the vehicle (movement B), then the weight 60 assumes a fully raised position in the pressure chamber 10, as illustrated in Figure 11, and causes the stem 61 to slide upwardly a corresponding distance relative to the tubular member 26. Consequently, the recess 62 in the stem 61 establishes communication between the uppermost passages 48 and 49, while the recess 63 is above and out of communication with the lowermost passage 48. As a result, no fluid from the pressure chamber 10 is supplied to the pressure chamber 45, but fluid from the pressure chamber 10 is supplied to pressure chamber 44. Thus, the flow of fluid upward through the piston 15 encounters relatively high resistance provided by the fluid in pressure chamber 44 in addition to the valve 34 and spring-pressed flange 32 of the slide 30. In this instance, the upward flow of fluid through the piston is through passages 36 and thence in two directions from the annular chamber 95 at the upper ends of said passages, one through passage 56, recess 54, uppermost passage 49, recess 62, uppermost passage 48, passage 52 to pressure chamber 44, and the other past the outer periphery of valve 34 to the space in the pressure chamber 10 above guide 28. Resistance is also provided by the valve 87 as the fluid at the lower end of the pressure chamber 10 flows downwardly through passages 83 past the outer periphery of said valve to the reserve chamber 11.

When the downward movement of the ground wheels or unsprung weight of the vehicle causes extension or rebound of the shock absorber (movement C), then the weight 60 assumes a slightly raised position in the pressure chamber 10 and causes stem 61 to slide upwardly a corresponding amount relative to the tubular member 26. Consequently, the recess 63 in the stem 61 remains out of communication with the lowermost passage 48, while the recess 62 in the stem 61 establishes communication between the uppermost passages 48 and 49. However, such communication between the uppermost passages 48 and 49 is ineffective at this time because the flow of fluid through the piston 15 is downwardly through passages 37 past valve 35 to the space in the pressure chamber 10 below the guide 31, instead of upwardly in passages 36 in said piston through passage 56 and recess 54 to the uppermost passage 49. As a result, no fluid from the pressure chamber 10 is supplied to the pressure chamber 44. Likewise, no fluid from the pressure chamber 10 can reach pressure chamber 45 because communication between the lowermost passages 48 and 49 is cut off by recess 63. Thus, in this instance, the resistance to the flow of fluid downward through the piston 15 is provided only by the valve 35 and the pressure exerted by the spring 41 upon the flange 33 of slide 31 against said valve. Resistance is also provided by the spring arms 86 bearing against valve 84 as the fluid from the reserve chamber 11 flows upwardly through the central opening 82 between the valve 84 and its seat 97 to the pressure chamber 10.

When the vehicle body or sprung weight of the vehicle attempts to move suddenly and rapidly upward (movement D), then the weight 60 assumes a fully lowered position in the pressure chamber 10, as illustrated in Figure 12, and causes the stem 61 to slide downwardly a corresponding distance relative to the tubular member 26. Consequently, the recess 63 in the stem 61 establishes communication between the lowermost passages 48 and 49, while the recess 62 is below and out of communication with the uppermost passage 48. As a result, no fluid from the pressure chamber 10 is supplied to the pressure chamber 44, but fluid from the pressure chamber 10 is supplied to pressure chamber 45. Thus, the flow of fluid downward through the piston 15 encounters relatively high resistance provided by the fluid in pressure chamber 45 in addition to the valve 35 and spring-pressed flange 33 of the slide 31. In this instance, the downward flow of fluid through the piston is through passages 37 and thence in two directions from the annular chamber 96 at the lower ends of said passages, one through passage 57, recess 55, lowermost passage 49, recess 63, lowermost passage 48, passage 53 to pressure chamber 45, and the other past the outer periphery of valve 35 to the space in the pressure chamber 10 below guide 29. Resistance is also provided by the spring arms 86 bearing against valve 84 as the fluid from the reserve chamber 11 flows upwardly through the central opening 82 between the valve 84 and its seat 97 to the pressure chamber 10.

Thus, from the foregoing it will be apparent that the construction and arrangement of the passages 56 and 57, recesses 54 and 55, passages 48 and 49, recesses 62 and 63, passages 52 and 53, and high pressure chambers 44 and 45 are extremely important features of my shock absorber construction and cause it to function properly to obtain the results desired. In this connection, the length of the recesses 62 and 63 is such that a dead end for the hydraulic medium is provided when said recesses are not in registration with both transverse passages 48 and 49. Note Figure 10. This eliminates undesired leakage or passage of the hydraulic medium through or around the piston, thus a more complete control is obtained. Moreover, in my construction the low and high stages of resistance cooperatively insure a smooth ride. For example, when the unsprung weight attempts to move, then the low resistance control imparts a minimum of action to the sprung weight. When the sprung weight attempts to move, then the inertia weight cuts in the high resistance control to prevent such movement. Thus, the low stage resistance will give ample but soft control for general boulevard riding, while the high stage resistance will handle severe riding conditions.

What I claim as my invention is:

1. In a hydraulic shock absorber, a fluid pressure cylinder, a piston operable in said cylinder and having fluid passages therethrough, a leaf spring valve carried by the piston for controlling the flow of fluid in one direction through one of said passages, and another leaf spring valve carried by the piston for controlling the flow of fluid in the opposite direction through another of said passages, means including a slidable valve for conducting fluid from one of said passages to the back of the leaf spring valve controlling said passage to resist the opening movement of said leaf spring valve, and an inertia weight connected to and adapted to actuate said slidable valve.

2. A hydraulic shock absorber having relatively movable sections attachable respectively to the sprung and unsprung weight of a vehicle, the section attachable to the unsprung weight including a fluid pressure cylinder, the section attachable to the sprung weight including a piston operable in said cylinder and having fluid passages therethrough, valves at opposite ends of said piston controlling the flow of fluid through said passages, one for each passage, and means operable automatically when the sprung weight attempts to move up or down relative to the unsprung weight to highly resist or prevent such movement, including a slidable member actuable by fluid from one of said passages for resisting opening movement of one of said valves.

3. A hydraulic shock absorber having relatively movable sections attachable respectively to the sprung and unsprung weight of a vehicle, the section attachable to the unsprung weight including a fluid pressure cylinder, the section attachable to the sprung weight including a piston operable in said cylinder and having fluid passages therethrough, valves carried by said piston for controlling the flow of fluid through said passages, one for each passage, and means within the pressure cylinder operable when the sprung weight attempts to move up or down relative to the unsprung weight to hold one of said valves in substantially closed position so that such attempted movement of the sprung weight will be highly resisted or prevented.

4. A hydraulic shock absorber having relatively movable sections attachable respectively to the sprung and unsprung weight of a vehicle, the section attachable to the unsprung weight including a fluid pressure cylinder, the section attachable to the sprung weight including a piston operable in said cylinder and having fluid passages therethrough, leaf spring valves at opposite ends of said piston for controlling the flow of fluid through said passages, one for each passage, and means operable when the sprung weight attempts to move up or down relative to the unsprung weight to highly resist or prevent such movement, including means for conducting fluid from one of said passages to the back of the leaf spring valve controlling said passage to resist opening movement of said leaf spring valve.

5. In a hydraulic shock absorber, a pressure cylinder, a piston operable in said cylinder and having fluid passages therethrough, a leaf spring valve carried by the piston for controlling the flow of fluid in one direction through one of said passages, another leaf spring valve carried by the piston for controlling the flow of fluid in the opposite direction through another of said passages, slides actuable by fluid from said passages for resisting opening movement of said valves, one for each valve, and means operable during the operation of said piston for controlling the supply of fluid from said passages to said slides.

6. In a hydraulic shock absorber, a pressure cylinder, a piston operable in said cylinder and having fluid passages therethrough, a leaf spring valve carried by the piston for controlling the flow of fluid in one direction through one of said passages, another leaf spring valve carried by the piston for controlling the flow of fluid in the opposite direction through another of said passages, means for resisting opening movement of said valves including spring pressed slides engaging said valves, one for each valve, and means including a weighted valve member for conducting fluid from said passages to the backs of the leaf spring valves controlling said passages to provide added resistance to the opening movement of said leaf spring valves.

7. In a hydraulic shock absorber, a pressure cylinder, a piston operable in said cylinder and having fluid passages therethrough, a leaf spring valve carried by the piston for controlling the flow of fluid in one direction through one of said passages, another leaf spring valve carried by the piston for controlling the flow of fluid in the opposite direction through another of said passages, and means operable during operation of the piston to resist opening movement of said valves, including a sectional pressure chamber at the back of each leaf spring valve and having a port exposed to the back of each valve, one section of each chamber being movable relative to the other section thereof into seating engagement with each valve, and means including a weighted valve for conducting fluid from one of the passages aforesaid to one of said sectional pressure chambers.

8. In a hydraulic shock absorber, a pressure cylinder, a piston operable in said cylinder and having fluid passages therethrough, a leaf spring valve carried by the piston for controlling the flow of fluid in one direction through one of said passages, another leaf spring valve carried by the piston for controlling the flow of fluid in the opposite direction through another of said passages, and means operable during operation of the piston to resist opening movement of said valves, including a sectional pressure chamber at the back of each leaf spring valve, one section of each chamber being movable relative to the other section thereof into seating engagement with each valve, and means including a slidable valve for conducting fluid from one of the passages aforesaid to one of said sectional pressure chambers.

9. In a hydraulic shock absorber, a pressure cylinder, a piston operating in said cylinder and having fluid passages therethrough, leaf spring valves at opposite ends of the piston for controlling the flow of fluid through said passages, one for each passage, high pressure fluid chambers in open communication with the backs of said valves and having movable sections for resisting the opening movement of said valves, and means including a weighted valve for controlling the supply of fluid under pressure to said high pressure chambers.

10. In a hydraulic shock absorber, a pressure cylinder, a piston operating in said cylinder and having fluid passages therethrough, leaf spring valves at opposite ends of the piston for controlling the flow of fluid through said passages, one for each passage, high pressure fluid chambers in open communication with the backs of said valves and having movable sections for resisting the opening movement of said valves, a supporting member for the piston having normally disconnected high pressure fluid passages communicating respectively with the passages in the piston and said high pressure chambers, and means operable during operation of the piston for connecting the normally disconnected passages.

11. In a hydraulic shock absorber, a pressure cylinder, a piston operating in said cylinder and having fluid passages therethrough, leaf spring valves at opposite ends of the piston for controlling the flow of fluid through said passages, one for each passage, high pressure fluid chambers in open communication with the backs of said valves and having movable sections for resisting the opening movement of said valves, a supporting member for the piston having normally disconnected high pressure fluid passages communicating respectively with the passages in the piston and said high pressure chambers, and means for connecting the normally disconnected passages including a spring supported inertia weight having a stem slidably engaging the supporting member and provided with recesses for establishing communication between said disconnected passages.

12. In a hydraulic shock absorber, a pressure cylinder, a piston operating in said cylinder and having fluid passages therethrough, leaf spring valves at opposite ends of the piston for controlling the flow of fluid through said passages, one for each passage, high pressure fluid chambers in open communication with the backs of said valves and having movable sections for resisting the opening movement of said valves, a supporting member for the piston having normally disconnected high pressure fluid passages communicating respectively with the passages in the piston and said high pressure chambers, means for connecting the normally disconnected passages including a spring supported inertia weight having a stem slidably engaging the supporting member and provided with recesses for establishing communication between said disconnected passages, and means for preventing fluid turbulence in the pressure cylinder from disturbing the action of the inertia weight.

13. In a hydraulic shock absorber, a pressure cylinder, a piston operating in said cylinder and having fluid passages therethrough, leaf spring valves at opposite ends of the piston for controlling the flow of fluid through said passages, one for each passage, high pressure fluid chambers in open communication with the backs of said valves and having movable sections for resisting the opening movement of said valves, a supporting member for the piston having normally disconnected high pressure fluid passages communicating respectively with the passages in the piston and said high pressure chambers, means for connecting the normally disconnected passages including an inertia weight having a stem slidably engaging the supporting member and provided with recesses for establishing communication between said disconnected passages, a rod carried by said supporting member, an adjusting nut carried by the rod, and a supporting spring for the inertia weight carried by the adjusting nut.

14. In a hydraulic shock absorber, a pressure cylinder, a piston operating in said cylinder and having crossed fluid passages extending therethrough, a rod for the piston spaced above the same, a tubular member adjustably connected to the piston rod, extending downwardly through the piston and having an enlarged end below the piston, leaf spring valves at opposite ends of the piston for controlling the flow of fluid through said passages, one for each passage, sectional pressure chambers on the tubular member between the piston and piston rod and between the piston and enlarged end of the tubular member, one section of each chamber being slidable relative to the other to resist opening movement of said valves, spacers between the other sections of said chambers and said valves for holding the latter in operative position relative to the respective passages, said spacers cooperating with the slidable sections of the chambers to provide ports for said sectional chambers in open communication with said valves, the tubular member having two pairs of vertically spaced fluid passages extending through a wall thereof, the piston and tubular member having connecting passages for conducting fluid from one of the crossed passages in the piston to one passage of each pair, each sectional chamber having a passage for conducting thereto fluid from the other passage of each pair, and means controlling the flow of fluid from one passage to the other of each pair including a valve slidably engaging the wall aforesaid of said tubular member.

15. In a hydraulic shock absorber, a pressure cylinder, a piston operating in said cylinder and having crossed fluid passages extending therethrough, a rod for the piston spaced above the same, a tubular member adjustably connected to the piston rod, extending downwardly through the piston and having an enlarged end below the piston, leaf spring valves at opposite ends of the piston for controlling the flow of fluid through said passages, one for each passage, sectional pressure chambers on the tubular member between the piston and piston rod and between the piston and enlarged end of the tubular member, one section of each chamber being slidable relative to the other to resist opening movement of said valves, spacers between the other sections of said chambers and said valves for holding the latter in operative position relative to the respective passages, said spacers cooperating with the slidable sections of the chambers to provide ports for said sectional chambers in open communication with said valves, the tubular member having two pairs of vertically spaced fluid passages extending through a wall thereof, the piston and tubular member having connecting passages for conducting fluid from one of the crossed passages in the piston to one passage of each pair, each sectional chamber having a passage for conducting thereto fluid from the other passage of each pair, and means controlling the flow of fluid from one passage to the other of each pair including a spring supported inertia weight below the piston having a stem slidably engaging the wall aforesaid of the tubular member and having vertically spaced recesses therein for registering with said pairs of passages.

16. In a hydraulic shock absorber, a tubular member having vertically spaced pairs of fluid passages extending through a wall thereof, and means controlling the flow of fluid from one passage to the other of each pair including a weighted valve slidably engaging said wall of the tubular member and having recesses for registering with said pairs of passages.

17. In a hydraulic shock absorber, a pressure cylinder, a piston operating in said cylinder and having a fluid passage therethrough, a leaf spring valve at one end of the piston for controlling the flow of fluid in one direction through said passage, a high pressure fluid chamber in open communication with the back of said valve and having movable sections for resisting the opening movement of said valve, a supporting member for the piston having normally disconnected high pressure fluid passages communicating respectively with the passage in the piston and said high pressure chamber, and means operable during operation of the piston for connecting the normally disconnected passages.

18. In a hydraulic shock absorber, a tubular member having a pair of normally disconnected fluid passages extending through a wall thereof, and means controlling the flow of fluid from one passage to the other of said pair including a weighted valve slidably engaging said wall of the tubular member and having a recess for registering with said pair of passages to connect the same.

19. In a hydraulic shock absorber, a fluid pressure cylinder, a piston operable in said cylinder and having fluid passages therethrough, a valve carried by the piston for controlling the flow of fluid in one direction through one of said passages, and another valve carried by the piston for controlling the flow of fluid in the opposite direction through another of said passages, and means including a slidable valve member for conducting fluid from one of said passages to the back of one of the valves aforesaid to resist the opening movement of said valve.

20. In a hydraulic shock absorber, a fluid pressure cylinder, a piston operable in said cylinder and having a fluid passage therethrough, a valve carried by the piston for controlling the flow of fluid in one direction through said passage, and means including a slidable valve member for conducting fluid from said passage to the back of the valve controlling said passage to resist opening movement of said valve.

21. In a hydraulic shock absorber, a fluid pressure cylinder, a piston operable in said cylinder and having a fluid passage therethrough, a valve carried by the piston for controlling the flow of fluid in one direction through said passage, means including a slidable valve for conducting fluid from said passage to the back of the valve controlling said passage to resist opening movement of said valve, and an inertia weight connected to and adapted to actuate said slidable valve.

22. In a hydraulic shock absorber, a pressure cylinder, a piston operable in said cylinder and having a fluid passage therethrough, a valve carried by the piston for controlling the flow of fluid in one direction through said passage, and means operable during operation of the piston to resist opening movement of said valve, including a sectional pressure chamber at the back of said valve and having a port exposed to the back of said valve, one section of said chamber being movable relative to the other section thereof into seating engagement with said valve, and means including a weighted valve for conducting fluid from said passage aforesaid to said sectional pressure chamber.

23. In a hydraulic shock absorber, a pressure cylinder, a piston operating in said cylinder and having a fluid passage therethrough, a valve at one end of the piston for controlling the flow of fluid in one direction through said passage, a high pressure fluid chamber in open communication with the back of said valve and having a movable section for resisting the opening movement of said valve, and means including a weighted valve controlling the supply of fluid under pressure to said high pressure chamber.

24. In a hydraulic shock absorber, a fluid pressure cylinder, a piston operable in said cylinder and having fluid passages therethrough, a normally closed valve carried by the piston at one end thereof for controlling the flow of the fluid in one direction through one of said passages, a normally closed valve carried by the piston at the other end thereof for controlling the flow of fluid in the opposite direction through another of said passages, a high pressure fluid chamber in open communication with the back of each valve aforesaid, each chamber having a movable section engaging and adapted to resist the opening movement of the valve with which it is in communication, and means including a slidable valve member for controlling the supply of fluid under pressure to each high pressure chamber.

25. In a hydraulic shock absorber, a fluid pressure cylinder, a piston operable in said cylinder and having fluid passages therethrough, a normally closed valve carried by the piston at one end thereof for controlling the flow of the fluid in one direction through one of said passages, a normally closed valve carried by the piston at the other end thereof for controlling the flow of fluid in the opposite direction through another of said passages, a high pressure fluid chamber at the back of and having a movable section engaging and adapted to resist the opening movement of each valve, and means for controlling the supply of fluid under pressure to each high pressure chamber.

RALPH H. WHISLER, Jr.